Patented June 6, 1950

2,510,739

UNITED STATES PATENT OFFICE 2,510,739

CYCLIC-ALKYL ISOTHIURONIUM HALIDES

Le Roy W. Clemence, Highland Park, and Marlin T. Leffler, Lake Bluff, Ill., assignors to Abbott Laboratories, North Chicago, Ill., a corporation of Illinois No Drawing. Application August 9, 1947, Serial No. 767,858

4 Claims. (Cl. 260—564)

The present application is a continuation-in-part of our prior application, Serial No. 723,907, filed January 23, 1947, which relates to oil soluble antimonials, and more specifically to tri-(substituted-mercapto)-antimonous acids.

The present application relates to novel compounds adaptable for use as intermediates in the preparation of the oil soluble antimonials of our prior application. More specifically, the present invention relates to ω-cyclic-alkyl isothiuronium halides.

Among cyclic alkyl compounds which have been prepared are those with the alkyl chain having from one to ten carbon atoms. The preferred range of compounds includes those having from one to five carbon atoms because the compounds are relatively easier to prepare.

The compounds used as intermediates in the synthesis of tri[ω-cyclohexylamylmercapto]-S-antimonous acid, tri[ω-(β-tetralyl)-butyl-mercapto]-S-antimonous acid and tri[ω-decalyl-butyl-mercapto]-S-antimonous acid described in our prior application are new in the art and have been prepared by the methods given below.

In general, the ω-cyclic-alkyl alcohol is converted to the ω-cyclic alkyl halide by means of a phosphorous halide or a hydrohalogen acid. This halide is reacted with thiourea to form the ω-cyclic-alkyl isothiuronium halide.

In detail, these compounds may be prepared as follows:

EXAMPLE I

*ω-Cyclohexylamyl bromide*

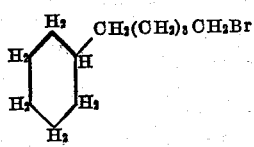

About 227 gms. (1.33 mole) of cyclohexylamyl alcohol (prepared by the hydrogenation of ethyl-ω-cyclohexyl valerate at a temperature of 250° C. under a pressure of 3,600 pounds per square inch using a copper chromite catalyst. This alcohol has a boiling point of 106–107° C. at 3 mm. pressure and a refractive index of 1.4634 at 25° C. when compared to the "D" line of sodium) is cooled to —10° C. in a 500 cc. flask. To this is added dropwise about 144 gms. (0.44 mole plus a 20% excess) of phosphorous tribromide at such a rate that the temperature remains below 0° C. The mixture is next permitted to reach room temperature while being stirred. After standing overnight it is heated to 100° C. for several hours. The mixture is then cooled and poured into 1,000 cc. of ice and water with agitation. The heavy, oily layer is separated and dissolved in ether, the ether solution is washed several times with water followed by a solution of sodium carbonate. After being rewashed with water, the ether solution is dried over magnesium sulfate, the magnesium sulfate is removed by filtration, and the ether evaporated. When fractionated in vacuum the yield obtained boils between 89.5–90.5° C. at 1 mm. pressure.

EXAMPLE II

*ω-Cyclohexylamyl isothiuronium bromide*

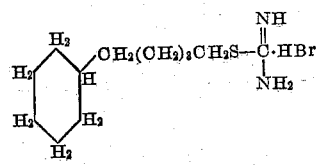

To about 23.3 gms. (0.1 mole) of ω-cyclohexylamyl bromide (Example I) is added a hot filtered solution of 7.6 gms. (0.1 mole) of thiourea in 125 cc. of absolute alcohol containing a small amount of benzene as the denaturant (12A absolute alcohol). The mixture is refluxed for 36 hours, cooled, and stirred until the whole mass becomes a crystalline mush. The solid is filtered, washed with a little acetone and dried. After recrystallization this material from boiling water, the compound has a melting point of 140–141° C.

EXAMPLE III

*ω-(β-Tetralyl)-butyl bromide*

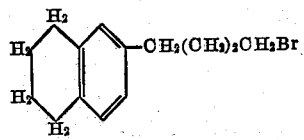

In a manner analogous to that of Example I but substituting ω-(β-tetralyl) butyl alcohol (prepared by hydrogenating ethyl ω-(tetralyl) butyrate. This alcohol has a boiling point of 167° C. at 5 mm. and a refractive index of 1.5391 at 25° C. as compared to the "D" line of sodium) for ω-cyclohexylamyl alcohol; the above mentioned compound is prepared. The ω-(β-tetralyl) butyl bromide obtained has a boiling point of 147–8° C. at 1 mm. pressure and a refractive index of 1.5528 at 25° C. when compared to the "D" line of sodium.

EXAMPLE IV

ω-Decalylbutyl bromide

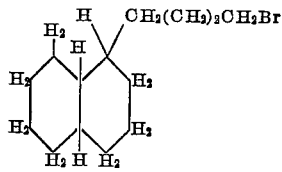

In a manner analogous to Example I but substituting ω-decalylbutyl alcohol (prepared by hydrogenating ethyl ω-decalylbutyrate. This alcohol has a boiling point of 148–9° C. at 0.5 mm. pressure and a refractive index of 1.4919 at 25° C. when compared to the "D" line of sodium) for a ω-cyclohexylamyl alcohol; the above mentioned compound is obtained. This ω-decalylbutyl bromide has a boiling point of 121–3° C. and a refractive index of 1.5020 at 25° C. when compared to the "D" line of sodium.

EXAMPLE V

ω-(β-Tetralyl)-butyl isothiuronium bromide

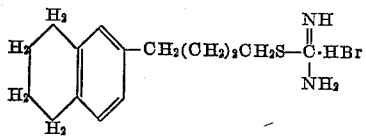

In a manner analogous to Example II but substituting ω-(β-tetralyl)-butyl bromide (Example III) for ω-cyclohexylamyl bromide; the above mentioned compound is obtained. This ω-(β-tetralyl)-butyl isothiuronium bromide has a melting point of 112–3° C.

EXAMPLE VI

ω-Decalylbutyl isothiuronium bromide

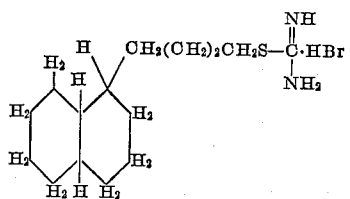

By substituting ω-decalyl-butyl bromide (Example IV) for ω-cyclohexylamyl bromide in Example II and proceeding as in that example, the compound ω-decalylbutyl isothiuronium bromide is obtained. This compound has a melting point of 123–124° C.

The references to the term halogen is intended to include the elements: chlorine, bromine, and iodine.

Others may readily adopt the invention for use under varying conditions of service, by employing one or more of the novel features disclosed, or equivalents thereof. As at present advised with respect to the apparent scope of our invention, we desire to claim the following subject matter.

We claim:

1. A ω-cyclic-alkyl isothiuronium halide with the formula:

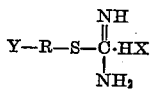

wherein Y is selected from the group consisting of cyclohexyl, tetralyl and decalyl, R is a lower alkylene group containing from one to ten carbon atoms and X is a halogen atom.

2. The compound ω-cyclohexylamyl isothiuronium bromide with the formula:

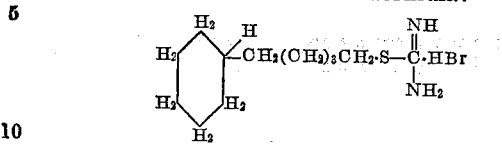

3. The compound ω-(β-tetralyl)-butyl isothiuronium bromide with the formula:

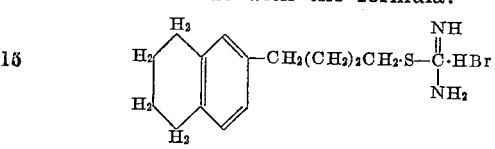

4. The compound ω-decalylbutyl isothiuronium bromide with the formula:

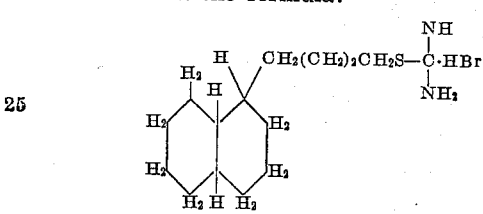

LE ROY W. CLEMENCE.
MARLIN T. LEFFLER.

REFERENCES CITED

The following references are of record in the file of this patent:

UNITED STATES PATENTS

| Number | Name | Date |
|---|---|---|
| 1,561,535 | Hahl | Nov. 17, 1925 |
| 2,147,346 | Johnson | Feb. 14, 1939 |
| 2,226,530 | Brown et al. | Dec. 31, 1940 |
| 2,229,992 | Schmidt | Jan. 28, 1941 |
| 2,270,893 | Orthner et al. | Jan. 27, 1942 |
| 2,302,885 | Orthner et al. | Nov. 24, 1942 |
| 2,338,178 | Graenacher | Jan. 4, 1944 |
| 2,390,046 | Albrecht | Dec. 4, 1945 |

FOREIGN PATENTS

| Number | Country | Date |
|---|---|---|
| 215,036 | Switzerland | Aug. 16, 1941 |
| 226,819 | Switzerland | Aug. 2, 1943 |

OTHER REFERENCES

Lecher: "Liebigs Annalen," vol. 445 (1925) p. 39.

Donleavy: "J. Am. Chem. Soc.," vol. 58 (1936), pp. 1004 and 1005.

Johnson et al.: "J. Am. Chem. Soc.," vol. 58 (1936), pp. 1348–1352.

Sprague et al.: "J. Am. Chem. Soc.," vol. 59 (1937), pp. 1837–1840.

Sprague et al.: "J. Am. Chem. Soc.," vol. 59 (1937), pp. 2439–2441.

Levy et al.: "J. Chem. Soc." (London), 1939, pp. 1442 to 1446.

Milley et al.: "J. Am. Chem. Soc.," vol. 62 (1940), pp. 2099–2102.

Wood et al.: "J. Am. Chem. Soc.," vol. 62 (1940), pp. 2674–2681.

Sprague et al.: "J. Am. Chem. Soc.," vol. 68 (1946), pp. 2155–2159.